United States Patent
Izquierdo Civera

(10) Patent No.: US 12,060,147 B2
(45) Date of Patent: Aug. 13, 2024

(54) RETRACTION ALERT FOR AIRCRAFT LANDING GEAR

(71) Applicant: AIRBUS OPERATIONS LIMITED, Bristol (GB)

(72) Inventor: Fernando Izquierdo Civera, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 155 days.

(21) Appl. No.: 17/727,530

(22) Filed: Apr. 22, 2022

(65) Prior Publication Data
US 2022/0340269 A1 Oct. 27, 2022

(30) Foreign Application Priority Data
Apr. 26, 2021 (GB) .................................. 2105894

(51) Int. Cl.
*B64C 25/28* (2006.01)
*B64C 25/26* (2006.01)

(52) U.S. Cl.
CPC .............. *B64C 25/28* (2013.01); *B64C 25/26* (2013.01)

(58) Field of Classification Search
CPC .................................. B64C 25/28; B64C 25/26
See application file for complete search history.

(56) References Cited

U.S. PATENT DOCUMENTS

| | | | |
|---|---|---|---|
| 3,936,796 A * | 2/1976 | Bateman | G08G 5/0026 342/411 |
| 4,916,447 A | 4/1990 | Vermilion et al. | |
| 4,951,047 A | 8/1990 | Paterson et al. | |
| 6,854,689 B1 | 2/2005 | Lindahl et al. | |
| 2015/0122945 A1 * | 5/2015 | Kavounas | B64C 25/30 244/102 R |
| 2020/0047913 A1 | 2/2020 | Shavit | |
| 2020/0277043 A1 | 9/2020 | Kerr et al. | |
| 2020/0277044 A1 | 9/2020 | Kerr et al. | |
| 2022/0340268 A1 * | 10/2022 | Cote | B64D 43/00 |

FOREIGN PATENT DOCUMENTS

| | | |
|---|---|---|
| EP | 3 415 419 | 12/2018 |
| EP | 3 702 272 | 9/2020 |
| EP | 3 725 678 | 10/2020 |
| GB | 2571708 | 9/2019 |
| GB | 2587205 | 3/2021 |

OTHER PUBLICATIONS

Combined Search and Examination Report for GB Application No. 2105894.6 dated Feb. 8, 2022, 13 pages.

* cited by examiner

*Primary Examiner* — John A Tweel, Jr.
(74) *Attorney, Agent, or Firm* — Nixon & Vanderhye P.C.

(57) ABSTRACT

An aircraft system for an aircraft, the aircraft system including a controller configured, during a take-off procedure, to receive a first signal indicative of a climb rate of the aircraft and, when the controller determines, on the basis of the first signal, that the climb rate of the aircraft is positive, cause a retraction alert to be issued to a flight crew of the aircraft, the retraction alert indicative that a landing gear of the aircraft is retractable.

19 Claims, 3 Drawing Sheets

RETRACTION ALERT FOR AIRCRAFT LANDING GEAR

RELATED APPLICATION

This application incorporates by reference and claims priority to United Kingdom patent application GB 2105894-6, filed Apr. 26, 2021.

TECHNICAL FIELD

The present invention relates to an aircraft system for an aircraft, to a method of operating a controller of an aircraft system of an aircraft during a take-off procedure, and to an aircraft.

BACKGROUND

In some known aircraft, a landing gear of the aircraft is held in an extended position when the aircraft is on the ground and is retracted to a stowed position once the aircraft has taken off. Movement of the landing gear between the extended position and the stowed position is typically controlled by a pilot using cockpit controls of the aircraft, such as a landing gear lever. The landing gear causes aircraft drag during a take-off procedure until it reaches the stowed position.

SUMMARY

A first aspect of the present invention provides an aircraft system for an aircraft, the aircraft system comprising a controller that is configured, during a take-off procedure, to receive a first signal indicative of a climb rate of the aircraft and, when the controller determines, on the basis of the first signal, that the climb rate of the aircraft is positive, cause a retraction alert to be issued to a flight crew of the aircraft, the retraction alert indicative that a landing gear of the aircraft is retractable.

Optionally, the controller is configured to cause the retraction alert to be issued without causing retraction of the landing gear. Optionally, the controller is configured to cause the retraction alert to be issued without causing operation of a cockpit user interface that is operable by the flight crew to manually input a command to cause retraction of the landing gear.

Optionally, the controller is configured to cause the retraction alert to cease upon detection by the controller of a command, issued by the flight crew, to retract the landing gear. Optionally, the controller is configured to cause the retraction alert to cease upon elapse of a predetermined period of time. Optionally, the predetermined period of time starts when the controller causes the retraction alert to be issued. Optionally, the controller is configured to cause the retraction alert to cease, prior to initiation of retraction of the landing gear, based on the earlier of: detection by the controller of a command, issued by the flight crew, to retract the landing gear, and elapse of a predetermined period of time, the predetermined period of time starting when the controller causes the retraction alert to be issued.

Optionally, the controller is configured to receive a second signal indicative of lift-off of the aircraft and cause a lift-off alert to be issued to the flight crew of the aircraft on the basis of the second signal.

Optionally, the controller is configured to cause the lift-off alert to cease upon causation of issuance, by the controller, of the retraction alert. Optionally, the controller is configured to cause the lift-off alert to cease upon elapse of a predetermined time period. Optionally, the predetermined time period starts when the controller causes the lift-off alert to be issued. Optionally, the controller is configured to cause the lift-off alert to cease based on the earlier of: causation of issuance, by the controller, of the retraction alert, and elapse of a predetermined time period, the predetermined time period starting when the controller causes the lift-off alert to be issued.

Optionally, the controller is configured to receive a third signal indicative that a predetermined retraction inhibition criterion is met and inhibit issuance of the retraction alert on the basis of the third signal. Optionally, the controller is configured to receive a third signal indicative that a predetermined retraction inhibition criterion is met and cause the retraction alert to cease on the basis of the third signal.

Optionally, the predetermined retraction inhibition criterion comprises one or more of: that a landing gear retraction fault has occurred, that a threshold positive rate of climb of the aircraft is not achieved after lift-off of the aircraft, that a negative rate of climb is achieved after lift-off of the aircraft, that the aircraft is in contact with the ground after lift-off of the aircraft, and that a brake of the landing gear is at a temperature greater than a threshold temperature.

Optionally, the aircraft system comprises a cockpit user interface configured to issue the retraction alert to the flight crew of the aircraft. Optionally, the cockpit user interface is configured to visibly display the retraction alert to the flight crew of the aircraft. Optionally, the retraction alert comprises an audible alert or an illumination or a change in appearance of a light source of the cockpit user interface Optionally, the cockpit user interface is comprised in a landing gear lever unit of the aircraft system, the landing gear lever unit comprising a housing and a landing gear lever housed in the housing, the landing gear lever being movable relative to the housing by a flight crew of the aircraft to manually input a command to cause retraction of the landing gear of the aircraft.

Optionally, the landing gear lever unit comprises a light source, and the cockpit user interface is configured to visibly display the retraction alert to the flight crew of the aircraft by causing illumination of the light source.

Optionally, the cockpit user interface is configured to issue the lift-off alert. Optionally, the cockpit user interface is configured to issue the retraction alert in a different form to the lift-off alert.

A second aspect of the present invention provides an aircraft control system of an aircraft. The aircraft control system comprises a user interface and a controller communicatively coupled to the user interface. The user interface is operable by a flight crew of the aircraft to manually input a command to cause retraction of a landing gear of the aircraft. The controller is configured, during a take-off procedure, to determine that a predetermined gear retraction criterion is met and send a retraction signal to the user interface, when the controller determines that the predetermined gear retraction criterion is met. The user interface is configured to issue a retraction alert to a flight crew of the aircraft on the basis of the retraction signal received.

Optionally, the predetermined gear retraction criterion comprises one or more of: that the aircraft is flying with a positive climb rate, that the landing gear is in an extended position, and that lift-off of the aircraft has occurred.

Optionally, the controller is configured to send a cease-retraction-alert signal to the user interface when the user interface is operated by the flight crew to manually input the command to cause retraction of the landing gear of the aircraft, and the user interface is configured to cease the retraction alert on the basis of the cease-retraction-alert signal received.

Optionally, the aircraft control system of the second aspect of the invention comprises any combination of features described with reference to the aircraft system of the first aspect of the invention.

A third aspect of the present invention provides a method of operating a controller of an aircraft system of an aircraft during a take-off procedure. The method comprises the controller receiving a first signal indicative of a climb rate of the aircraft, the controller determining, on the basis of the first signal, that the climb rate of the aircraft is positive, and the controller causing a retraction alert to be issued to a flight crew of the aircraft, the retraction alert indicative that a landing gear of the aircraft is retractable.

Optionally, the method comprises the controller receiving a second signal indicative of lift-off of the aircraft, and the controller causing a lift-off alert to be issued to the flight crew of the aircraft on the basis of the second signal.

Optionally, the method comprises the controller receiving a third signal indicative that a predetermined retraction inhibition criterion is met, and the controller inhibiting issuance of the retraction alert on the basis of the third signal.

A fourth aspect of the present invention provides a non-transitory computer-readable storage medium storing instructions that, if executed by a controller of an aircraft system of an aircraft, cause the controller to carry out a method according to the third aspect of the present invention.

A fifth aspect of the present invention provides an aircraft comprising an aircraft system according to the first aspect of the present invention, or an aircraft control system according to the second aspect of the present invention, or a non-transitory computer-readable storage medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

As discussed above, in some known aircraft, the landing gear is held in an extended position when the aircraft is on the ground and is stowed at a stowed position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. Movement of the landing gear is typically controlled by a pilot using cockpit flight controls of the aircraft, such as a landing gear control lever.

The take-off procedure is one of the highest workload flight phases for flight crew. Amongst the many actions they perform during this period is the retraction of the landing gear after lift-off. During a take-off procedure, the pilot will typically manually initiate landing gear retraction upon confirming a positive aircraft climb rate. Positive climb rate typically is confirmed by the pilot or another member of the flight crew looking through a window of the cockpit to check that the aircraft is ascending from the ground or checking an altimeter or vertical speed indicator for an increase in altitude. Such confirmation typically occurs at about three seconds after lift-off.

The workload during a take-off procedure can be increased if a fault or failure occurs in an engine of the aircraft (commonly referred to as a "one engine inoperative", or "OEI", situation). While the aircraft will have been designed so that the remaining engine(s) can generate sufficient thrust to get the aircraft airborne with an acceptable safety margin, there will nevertheless be a reduction in total thrust generated or generatable by the engine(s) of the aircraft, meaning that drag caused by the landing gear has a greater proportional effect on aircraft performance compared to an "all engines operative", or "AEO", situation.

Some examples discussed herein are concerned with providing an alert to the flight crew to indicate that the landing gear is retractable, which could help ensure that landing gear retraction is commanded promptly.

The technology discussed herein has application at least in civil aircraft and military aircraft. Some examples discussed herein are implementable within these areas of application when there is only one flight crew. The engine of the aircraft discussed herein could be any type of aircraft engine for generating thrust, such as a gas turbine engine, an electric motor, or a piston engine.

Figure 1:
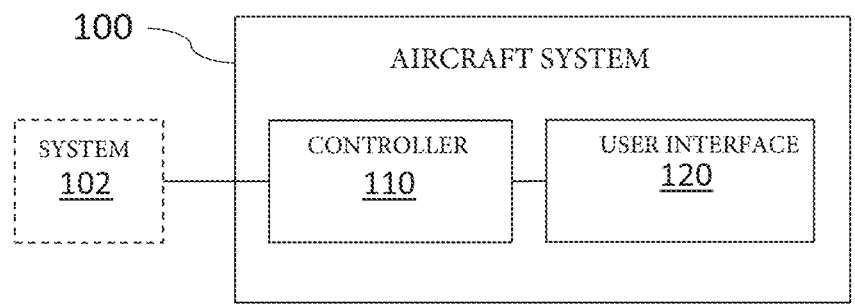
FIG. 1 shows a schematic view of an example of an aircraft system.

FIG. 1 shows a schematic view of an aircraft system 100 for an aircraft according to an example. The system 100 comprises a controller 110 and a cockpit user interface 120, which is located in a cockpit of the aircraft. In other examples, the cockpit user interface 120 is omitted. That is, the cockpit user interface 120 may be comprised in one or more other systems with which the aircraft system 100 interacts. The controller 110 is configured, during a take-off procedure, to receive a first signal indicative of a climb rate of the aircraft. A take-off procedure is a procedure carried out between an aircraft starting a take-off acceleration on a runway and the aircraft reaching acceleration altitude after lift-off.

The controller 110 is configured to determine, on the basis of the first signal, that the climb rate of the aircraft is positive. In some examples, the first signal is an electrical or electronic signal received by the controller 110 when (e.g. only when) the climb rate of the aircraft is positive. In other examples, the first signal is a substantially continuous or regular signal (e.g. an electrical or electronic signal) received by the controller 110 during the take-off procedure, and the controller 110 is configured to determine, based on the first signal, when a positive climb rate of the aircraft has been achieved. In other examples, the controller 110 is configured to determine that the climb rate of the aircraft is positive, based on the first signal, in any suitable way that would be known to the skilled person. The controller 110 may be configured to determine that the climb rate is positive by performing a calculation based on the first signal, or by comparing the first signal, or at least content of the first signal (e.g. when the signal comprises content such as a data string or data packets), to a look-up table. In some examples, the controller 110 is configured to determine that the climb rate of the aircraft is positive based on the first signal and one or more additional inputs receivable by the controller 110, such as an input indicative of angle of rotation of the aircraft or an input indicative of engine thrust. In some examples, the controller 110 is configured to receive the first signal from a separate aircraft system, such as the separate aircraft system 102 shown in FIG. 1, for example a flight management computer of the aircraft. In examples, the controller 110 is configured to receive the first signal from another controller, an inclinometer or an accelerometer. Examples of the controller and the aircraft system are discussed below.

When the controller determines that the climb rate of the aircraft is positive, the controller 110 is configured to cause a retraction alert to be issued to a flight crew of the aircraft. The retraction alert is indicative that a landing gear of the aircraft is retractable by the flight crew. The cockpit user interface 120 is configured to issue the retraction alert to the flight crew of the aircraft and, in this example, the retraction alert is a visible indication on the cockpit user interface 120. For example, the cockpit user interface 120 comprises a light source (e.g. a blub or light emitting diode (LED)) and the cockpit user interface 120 is configured to cause illumination or a change in appearance (e.g. colour, hue or brightness) of the light source to visibly display the retraction alert. In some examples, the cockpit user interface 120 comprises a screen and the visible indication comprises a change in appearance of the screen or a portion of the screen, such as the generation of a word, symbol or colour on the screen to display the retraction alert. In other examples, the retraction alert is an audible (e.g. a sound from a speaker in the cockpit) or haptic (e.g. a vibration of a part of the cockpit user interface 120 or a vibration of another component comprised in the cockpit) alert that is receivable by the flight crew, or an alert that is any combination of visible, audible and haptic.

In some examples, the controller 110 is configured to cause the retraction alert to be issued on the basis of a determination that a positive climb rate of the aircraft has been maintained for a predetermined period of time. This can help to prevent a 'false' retraction alert, for example in the event that the aircraft makes a secondary contact with the runway after initial lift-off of the aircraft. In some examples, the controller 110 is configured to cause the retraction alert to be issued on the basis of a determination by the controller 110 that the positive climb rate of the aircraft is above a threshold climb rate. This can help to ensure that the retraction alert is not issued too early during the take-off procedure.

In this example, the controller 110 is configured to cause the retraction alert to cease on the basis of detection by the controller 110 of a command, issued by the flight crew, to retract the landing gear or, if it is earlier, elapse of a predetermined period of time. In this example, the predetermined period of time starts when the controller 110 causes the retraction alert to be issued. In other examples, the predetermined period of time starts when the controller 110 receives a signal indicative that lift-off of the aircraft has occurred. In an example, the controller 110 is configured to cause the retraction alert to cease ten seconds after the controller 110 causes the retraction alert to be issued, if the command, issued by the flight crew, to retract the landing gear is not received during the ten seconds. This can be advantageous in the event that the flight crew wishes for the landing gear to remain in the extended position, so that the flight crew does not require a reminder from the retraction alert to retract the landing gear.

In this example, the controller 110 is configured to receive a second signal indicative of lift-off of the aircraft. For example, the second signal is indicative of one or more of: aircraft speed, aircraft altitude, weight on wheels, wheel speed, landing gear strut length, aircraft rotation and aircraft angle. In some examples, the controller 110 is configured to receive the second signal from a separate aircraft system, such as the separate aircraft system 102 shown in FIG. 1, for example a flight management computer of the aircraft. In other examples, the controller 110 is configured to determine that lift-off of the aircraft has occurred based on the second signal, in any suitable way that would be known to the skilled person, such as by performing a calculation based on the second signal, or by comparing the second signal, or at least content of the second signal (e.g. when the signal comprises content such as a data string or data packets), to a look-up table. In some examples, the second signal is an electrical or electronic signal received by the controller 110 when (e.g. only when) lift-off of the aircraft has occurred. In other examples, the second signal is a substantially continuous or regular signal (e.g. an electrical or electronic signal) received by the controller 110 during the take-off procedure, and the controller 110 is configured to determine, based on the second signal, that lift-off of the aircraft has occurred. In some examples, the controller 110 is configured to determine that lift-off of the aircraft has occurred based on the second signal and one or more additional inputs receivable by the controller 110, such as inputs indicative of any of the parameters listed above for determining aircraft lift-off.

The controller 110 is configured to cause a lift-off alert to be issued to the flight crew of the aircraft on the basis of the second signal. In some examples, the controller 110 is configured to determine that lift-off of the aircraft has occurred based on the second signal, and to cause the lift-off alert to be issued on the basis of the determination that lift-off of the aircraft has occurred. The controller 110 is configured to cause the lift-off alert to be issued before causing issuance of the retraction alert. In some examples, the aircraft system 100 is configured such that issuance of the lift-off alert by the controller 110 causes a landing gear user interface (not shown in FIG. 1) to be placed in an operable state. When in such a state, the landing gear user interface is operable by a flight crew of the aircraft to manually input a command to cause retraction of a landing gear of the aircraft. That is, the landing gear user interface is in a state in which it is inoperable to manually input the command before lift-off of the aircraft and is placed in the operable state when the lift-off alert is issued by the controller 110. For example, when the landing gear user interface comprises a user-movable device, a mechanical lock, such as a baulk solenoid, may prevent the flight crew from manually moving the device to command retraction of the landing gear before the controller 110 determines that lift-off of the aircraft has occurred. In some examples, the landing gear user interface comprises the cockpit user interface 120.

In this example, the lift-off alert is visibly displayed on the cockpit user interface 120. For example, the cockpit user interface 120 comprises a light source (e.g. a blub or LED) that is turned on or changes appearance (e.g. colour, hue or brightness) to display the lift-off alert. For example, the cockpit user interface 120 comprises a screen that displays a word, symbol or colour to display the lift-off alert. In other examples, the lift-off alert is an audible (e.g. a sound from a speaker in the cockpit) or haptic (e.g. a vibration of a part of the cockpit user interface 120 or a vibration of another component comprised in the cockpit) alert that is receivable by the flight crew, or an alert that is any combination of visible, audible and haptic.

In this example, the retraction alert is issued by the cockpit user interface 120 in a different form to the lift-off alert. In this example, the controller 110 is configured to cause the lift-off alert to cease upon causation of issuance, by the controller 110, of the retraction alert. That is, the retraction alert replaces the lift-off alert. By way of example, the lift-off alert comprises an illumination of a light source of the cockpit user interface 120 in a first colour, and the retraction alert comprises an illumination of the (or a different) light source in a second, different colour. By way of another example, the lift-off alert comprises an illumination of a light source of the cockpit user interface 120, and the retraction alert comprises flashing of the light source between alternating brightness levels or between on and off states. By way of a further example, the lift-off alert comprises an audible sound issued from a speaker comprised in the cockpit user interface 120 and the retraction alert comprises the visible display of an upward-facing arrow on a screen comprised in the cockpit user interface 120.

In some examples, the controller 110 is configured to cause the lift-off alert to cease upon elapse of a predetermined time period. In this example, the predetermined time period starts when the controller 110 causes the lift-off alert to be issued. In an example, the controller 110 is configured to cause the lift-off alert to cease ten seconds after the controller 110 causes the lift-off alert to be issued if the controller does not cause the lift-off alert to cease for another reason during the ten seconds. In examples, the controller 110 is configured to cause the lift-off alert to cease is if the aircraft has made contact with the ground after initial lift-off, or the controller 110 causes the retraction alert to be issued on the basis of a the first signal. This can help to prevent the flight crew from issuing the command to retract the landing gear before, for example, a positive rate of climb of the aircraft has been achieved.

In some examples, the controller 110 is configured to inhibit the lift-off alert upon detection, by the controller 110, that the aircraft is in contact with the ground after an initial lift-off of the aircraft has occurred. The detection that the aircraft is in contact with the ground may be made by the controller 110, or may be made by a separate aircraft system, such as the aircraft system 102 shown in FIG. 1, and communicated to the controller 110, for example by an electronic signal receivable by the controller 110. This may help to alert the flight crew to the fact that the aircraft is on the ground again, so that the flight crew do not attempt to command retraction of the landing gear. In the example described above in which issuance of the lift-off alert causes a landing gear user interface to be put in an operable state, inhibiting the lift-off alert causes the lift-off alert to cease and, in some examples, the landing gear user interface to be returned to an inoperable state so that the flight crew cannot command retraction of the landing gear.

In other examples, the controller 110 is configured to cause the retraction alert without causing the lift-off alert to cease. For example, the lift-off alert comprises the display of the word "LIFT-OFF ACHIEVED" on a screen comprised in the cockpit user interface 120 and the retraction alert comprises the additional display of the words "RETRACT GEAR" on the screen. Alternatively, the lift-off alert comprises the illumination of a first light source comprised in the cockpit user interface 120 and the retraction alert comprises the continued illumination of the first light source and illumination of a second light source comprised in the cockpit user interface 120.

In this example, the controller 110 is configured to receive a third signal indicative that a predetermined retraction inhibition criterion is met and to inhibit issuance of the retraction alert on the basis of the third signal. In examples, the controller 110 is configured to receive the third signal indicative that a predetermined retraction inhibition criterion is met and to determine that the predetermined retraction inhibition criterion is met based on the third signal, in any suitable way that would be known to the skilled person, such as by performing a calculation based on the third signal, or by comparing the third signal, or at least some content of the third signal (e.g. when the signal comprises content such as a data string or data packets), to a look-up table. In some examples, the controller 110 is configured to determine that the predetermined retraction inhibition criterion is met and to inhibit issuance of the retraction alert on the basis of the determination that the predetermined retraction inhibition criterion is met. In some examples, the controller 110 is configured to receive the third signal from a separate aircraft system, such as the separate aircraft system 102 shown in FIG. 1, for example a flight management computer of the aircraft. In some examples, the third signal is an electrical or electronic signal received by the controller 110 when (e.g. only when) the predetermined retraction inhibition criterion is met. In other examples, the third signal is a substantially continuous or regular signal (e.g. an electrical or electronic signal) received by the controller 110 during the take-off procedure, and the controller 110 is configured to determine, based on the third signal, that the predetermined retraction inhibition criterion is met. In some examples, the controller 110 is configured to determine that the predetermined retraction inhibition criterion is met based on the third signal and one or more additional inputs receivable by the controller 110.

In some examples, the controller 110 is configured to inhibit issuance of the retraction alert before causation of the issuance of the retraction alert, so that the retraction alert is not issued during the take-off procedure. In other examples, the controller 110 is configured to inhibit issuance of the retraction alert by causing the retraction alert to cease on the basis of the third signal, after issuance of the retraction alert during the take-off procedure. Inhibition of the retraction alert can provide the benefit of allowing the flight crew to continue with their workload during the take-off procedure without the distraction of the retraction alert being present in situations where it is not required or suitable.

In some examples, the predetermined retraction inhibition criterion comprises that a landing gear retraction fault has occurred, such that the retraction alert is not issued if the landing gear cannot be retracted by the flight crew. In some examples, the predetermined retraction inhibition criterion comprises that a threshold positive rate of climb of the aircraft is not achieved after lift-off of the aircraft, such that the retraction alert is not issued if a climb rate of the aircraft is too low, which may be indicative of another fault in the aircraft. In some examples, the predetermined retraction inhibition criterion comprises that a negative rate of climb is achieved after lift-off of the aircraft, such that the retraction alert is not issued if a climb rate of the aircraft is negative, for example in case the aircraft briefly makes contact with the ground after initial lift-off. In some examples, the predetermined retraction inhibition criterion comprises that a brake of the landing gear is at a temperature greater than a threshold temperature, such that the retraction alert is not issued because it is beneficial for the landing gear to remain in the extended position for a period of time to allow the brake to cool. In some examples, the predetermined retraction inhibition criterion comprises that the aircraft is in contact with the ground after an initial lift-off of the aircraft has occurred, such that the retraction alert is not issued or is caused, by the controller 110, to cease if the aircraft makes contact with the ground after initial lift-off. This may help to alert the flight crew to the fact that the aircraft is on the ground again, so that the flight crew do not attempt to command retraction of the landing gear.

Figure 2:
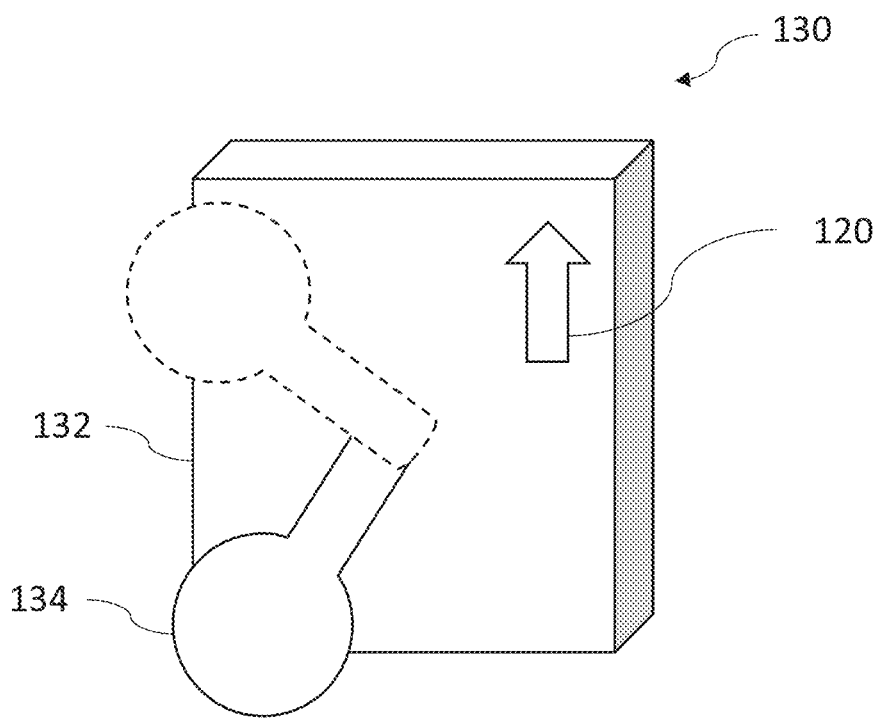
FIG. 2 shows an example of a landing gear lever unit.

FIG. 2 shows an example of a landing gear user interface. In some examples, the landing gear user interface is comprised in the aircraft system 100 as shown in FIG. 1. In this example, the landing gear user interface is a landing gear lever unit 130 comprising a housing 132 and a landing gear lever 134 housed in the housing 132. The landing gear lever 134 is manually movable relative to the housing 132 by the flight crew from a first position (shown in FIG. 2 in solid lines) to a second position (shown in FIG. 2 in broken lines) to input a command to cause retraction of a landing gear of the aircraft. In other examples, the landing gear user interface takes any other form suitable for allowing a flight crew of the aircraft to input the command to cause retraction of the landing gear, such as, for example, a touch screen, a handle or a button.

In some examples, the cockpit user interface 120 is comprised in the landing gear user interface. In this example, the cockpit user interface 120 is located in or on the housing 132 of the landing gear lever unit 130. In other examples, the cockpit interface is located on the landing gear lever 134. In this example, the cockpit user interface 120 is an illuminable upward-pointing arrow. In use, the upward-pointing arrow is illuminated in a first colour to display the lift-off alert and in a second, different colour to display the retraction alert. In other examples, the cockpit user interface 120 comprises two light sources and the first of the two light sources is illuminated to display the lift-off alert and the second of the two light sources is illuminated to display the retraction alert. In yet other examples, the cockpit user interface 120 comprises any other suitable device to issue the retraction alert or the lift-off alert.

In examples, the aircraft system 100 comprises a landing gear control system of the aircraft and the controller 110 is configured to receive one or more of the first, second and third signals from a flight management computer of the aircraft. For example, a flight management computer is configured to determine a climb rate of the aircraft and send the first signal to the controller 110. For example, a flight management computer is configured to determine that lift-off of the aircraft has occurred and send the second signal to the controller 110. For example, another controller of the landing gear control system is configured to determine that a landing gear retraction fault has occurred and to send the third signal to the controller 110. In examples, the controller 110 is configured to cause a flight warning system of the aircraft to issue the retraction alert or the lift-off alert to the flight crew of the aircraft.

An example provides an aircraft control system of an aircraft. The aircraft control system comprises a user interface and a controller communicatively coupled to the user interface. The user interface is operable by a flight crew of the aircraft to manually input a command to cause retraction of a landing gear of the aircraft. The controller is configured, during a take-off procedure, to determine that a predetermined gear retraction criterion is met and send a retraction signal to the user interface when the controller determines that the predetermined gear retraction criterion is met. The user interface is configured to issue a retraction alert to a flight crew of the aircraft on the basis of the retraction signal received. In an example, the aircraft control system is the aircraft system 100 of FIG. 1, the controller is the controller 110 of FIG. 1, and the user interface is the landing gear lever unit 130 of FIG. 2. In this example, the upward-pointing arrow 120 is illuminated on the basis of the retraction signal. In other examples, the controller is configured according to any of the examples described above with reference to the controller 110 of FIG. 1.

In examples, the predetermined gear retraction criterion comprises that the aircraft is flying with a positive climb rate, such that the retraction alert is not issued until a positive climb rate of the aircraft has been confirmed. In examples, the predetermined gear retraction criterion comprises that the landing gear is in an extended position, such that the retraction alert is not issued if the landing gear has already started moving from the extended position to the stowed position or is already in the stowed position, for example in instances in which the flight crew commands retraction of the landing gear before the controller 110 causes the retraction alert to be issued. In examples, the predetermined gear retraction criterion comprises that lift-off of the aircraft has occurred, such that the retraction alert is not issued before lift-off of the aircraft has occurred.

In examples, the controller is configured to send a cease-retraction-alert signal to the user interface when the user interface is operated by the flight crew to manually input the command to cause retraction of the landing gear of the aircraft, and the user interface is configured to cease the retraction alert on the basis of the cease-retraction-alert signal received. The retraction alert therefore does not continue after retraction of the landing gear is commanded by the flight crew.

Figure 3:
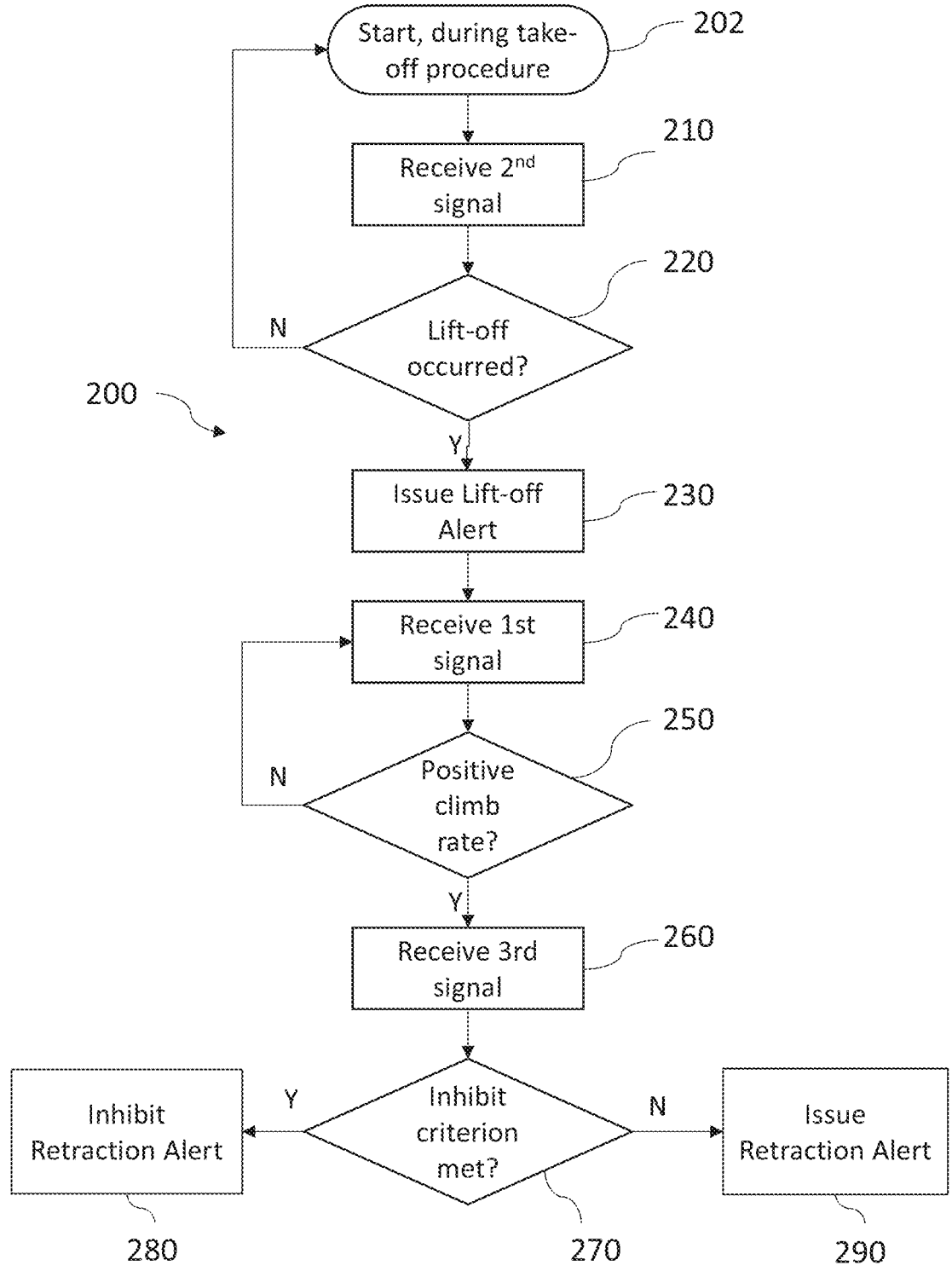
FIG. 3 shows a flow diagram showing an example of a method of operating a controller of an aircraft system of an aircraft during a take-off procedure.

There will now be described a method of operating a controller of an aircraft system of an aircraft during a take-off procedure. The aircraft system may, for example, be any aircraft system described above, such as the aircraft system 100 illustrated in FIG. 1. The controller may, for example, be the controller 110 as described in any of the examples given above. FIG. 3 shows a flow chart showing a method 200 according to an example. In other examples, one or more parts of the method 200 may be omitted, or the parts of the method 200 may be performed in a different sequence to that shown in FIG. 3.

The method 200 starts during a take-off procedure of the aircraft (as shown in start box 202), for example at the start of an acceleration down a runway. In the example method of FIG. 3, the method 200 comprises the controller receiving a second signal indicative of lift-off of the aircraft (as shown in action box 210) when the aircraft lifts-off, and the controller determining whether lift-off of the aircraft has occurred on the basis of the second signal (as shown in decision box 220). In this example, when the outcome of the decision box 220 is negative, the method 200 returns to the start 202.

In this example, when the outcome of the decision box 220 is positive, the controller causes a lift-off alert to be issued to a flight crew of the aircraft (as shown in action box 230). The lift-off alert is therefore issued only after lift-off of the aircraft.

In this example, the method 200 comprises the controller receiving a first signal indicative of a climb rate of the aircraft (as shown in action box 240) and the controller determining whether a positive climb rate of the aircraft has been achieved on the basis of the first signal (as shown in decision box 250). In this example, when the outcome of the decision box 250 is negative, the method 200 returns to the action box 240 and the controller receives an updated first signal indicative of a climb rate of the aircraft. In some examples, when the outcome of the decision box 250 is negative, the controller inhibits a retraction alert from being issued to the flight crew of the aircraft.

In this example, when the outcome of the decision box 250 is positive, the method 200 comprises the controller receiving a third signal indicative that a predetermined retraction inhibition criterion is met (as shown in action box 260) and determining whether the predetermined retraction inhibition criterion is met on the basis of the third signal (as shown in decision box 270). In examples, the predetermined retraction inhibition criterion comprises one or more of: that a landing gear retraction fault has occurred, that a threshold positive rate of climb of the aircraft is not achieved after lift-off of the aircraft, that a negative rate of climb is achieved after lift-off of the aircraft, that the aircraft is in contact with the ground after lift-off of the aircraft, and that a brake of the landing gear is at a temperature greater than a threshold temperature.

In this example, when the outcome of the decision box 270 is positive, the controller inhibits a retraction alert from being issued to the flight crew of the aircraft. In this example, when the outcome of the decision box 270 is negative, the controller causes a retraction alert to be issued to a flight crew of the aircraft, the retraction alert indicative that a landing gear of the aircraft is retractable.

In other examples, the action box 260 and the decision box 270 are omitted from the method and, when the outcome of the decision box 250 is positive, the controller causes the retraction alert to be issued to a flight crew of the aircraft, the retraction alert indicative that a landing gear of the aircraft is retractable. In some examples, the third signal could be received (as shown in action box 260) after the retraction alert is issued (as shown in action box 290), such that the determining whether the predetermined retraction inhibition criterion is met on the basis of the third signal (as shown in decision box 270) occurs after the retraction alert is issued (as shown in action box 290). In such examples, if the outcome of decision box 270 is positive, the retraction alert is inhibited (as shown in action box 280) by ceasing the retraction alert.

Some methods according to examples, such as the method 200 shown in FIG. 3, comprise determining whether the aircraft is in contact with the ground after lift-off of the aircraft (not shown in FIG. 3). When the outcome of the determination is positive, the method comprises inhibiting the lift-off alert, for example causing the lift-off alert to cease, and then returning to the start of the method. When the outcome of the determination is negative, a remainder of the method is performed, for example a remainder of the method 200 described with reference to FIG. 3. In an example based on the method 200 shown in FIG. 3, the determination is performed after action box 230 and, if the determination is positive, the lift-off alert is caused to cease and the method returns to start box 202. If the determination is negative, action box 240 is performed.

Figure 4:
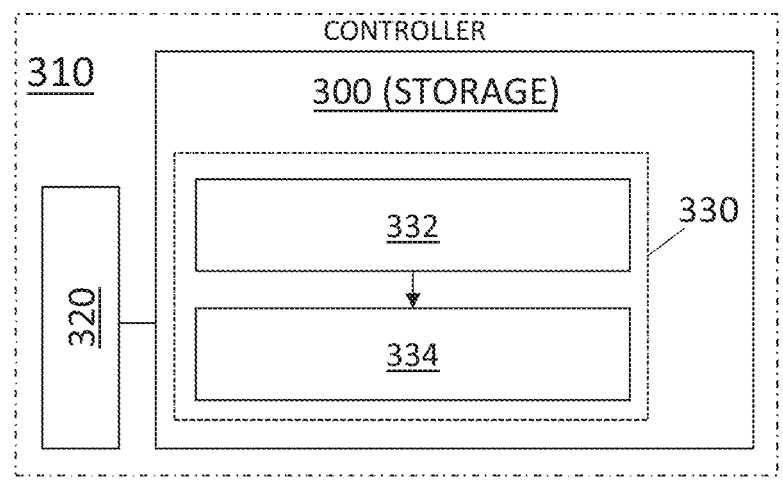
FIG. 4 shows a schematic diagram of an example of a non-transitory computer-readable storage medium.

FIG. 4 shows a schematic diagram of a non-transitory computer-readable storage medium 300 according to an example. The non-transitory computer-readable storage medium 300 stores instructions 330 that, if executed by a processor 320 of a controller 310, cause the processor 320 to perform a method according to an example. In some examples, the controller 310 is the controller 110 as described above with reference to FIG. 1 or any variation thereof discussed herein. The instructions 330 comprise: receiving 332 a first signal indicative of a climb rate of the aircraft, and causing 334, when the first signal is indicative of a positive climb rate of the aircraft, a retraction alert to be issued to a flight crew of the aircraft, the retraction alert indicative that a landing gear of the aircraft is retractable. In other examples, the instructions 330 comprise instructions to perform any other example method described herein, such as the method 200 described above with reference to FIG. 3.

Figure 5:
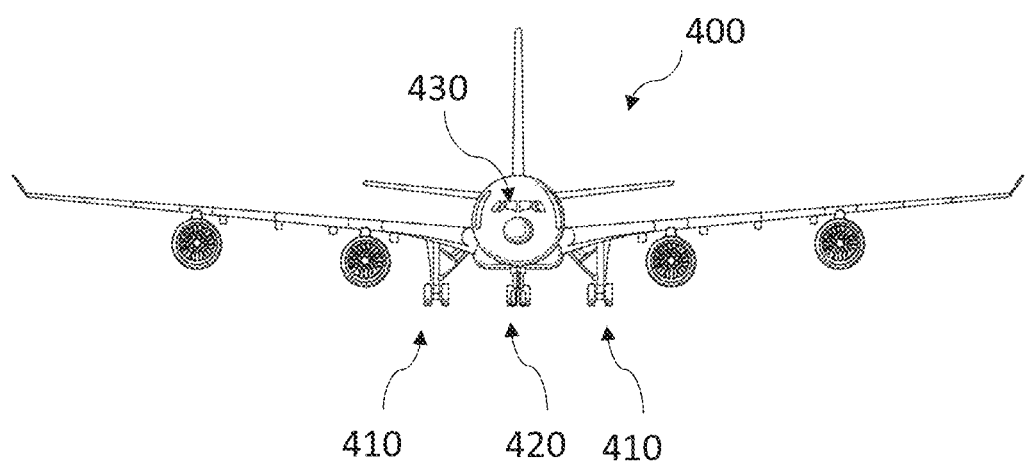
FIG. 5 shows a schematic front view of an example of an aircraft.

FIG. 5 shows a schematic diagram of an aircraft 400 in accordance with an example. In this example, the aircraft 400 comprises two main landing gears 410 and a nose landing gear 420. The aircraft 400 also comprises the non-transitory computer-readable storage medium 300 (not shown) discussed above with reference to FIG. 4. The aircraft 400 also comprises an aircraft system (not shown), such as an aircraft system 100 as described in any of the examples above with reference to FIG. 1. The aircraft 400 also has a cockpit 430, located in which is a cockpit user interface, such as the cockpit user interface 120 as described in any of the examples above with reference to FIG. 1 or FIG. 2.

It is to be noted that the term "or" as used herein is to be interpreted to mean "and/or", unless expressly stated otherwise.

The above examples are to be understood as non-limiting illustrative examples of how the present invention, and aspects of the present invention, may be implemented. Further examples of the present invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present invention, which is defined in the accompanying claims.

The invention claimed is:

1. An aircraft system for an aircraft, the aircraft system comprising a controller that is configured, during a take-off procedure, to:
   receive a first signal indicative of a climb rate of the aircraft; and
   when the controller determines, based on the first signal, that the climb rate of the aircraft is positive, and in response to the determination causes a retraction alert to be issued to a flight crew of the aircraft, wherein the retraction alert is indicative that a landing gear of the aircraft is retractable,
   wherein the controller is configured to cause the retraction alert to be issued without causing operation of a cockpit user interface operable by a flight crew to manually input a command to cause retraction of the landing gear.

2. The aircraft system according to claim 1, comprising a cockpit user interface, and configured to issue the retraction alert to the flight crew of the aircraft.

3. The aircraft system according to claim 2, wherein the cockpit user interface is configured to visibly display the retraction alert to the flight crew of the aircraft.

4. The aircraft system according to claim 2, wherein the cockpit user interface is in a landing gear lever unit of the aircraft system, the landing gear lever unit comprising:
   a housing, and
   a landing gear lever housed in the housing, wherein the landing gear lever is movable relative to the housing by a flight crew of the aircraft to manually input a command to cause retraction of the landing gear of the aircraft.

5. The aircraft system according to claim 4, wherein the landing gear lever unit comprises:
a light source, and
the cockpit user interface is configured to visibly display the retraction alert to the flight crew of the aircraft by causing illumination of the light source.

6. An aircraft system for an aircraft, the aircraft system comprising a controller that is configured, during a take-off procedure, to:
receive a first signal indicative of a climb rate of the aircraft;
determine, based on the first signal, that the climb rate of the aircraft is positive, and in response to the determination cause a retraction alert to be issued to a flight crew of the aircraft, wherein the retraction alert is indicative that a landing gear of the aircraft is retractable; and
cause the retraction alert to cease, prior to initiation of retraction of the landing gear, based on an earlier of:
detection by the controller of a command, issued by the flight crew, to retract the landing gear; and
elapse of a predetermined period of time, the predetermined period of time starting when the controller causes the retraction alert to be issued.

7. An aircraft system for an aircraft, the aircraft system comprising a controller that is configured, during a take-off procedure, to:
receive a first signal indicative of a climb rate of the aircraft;
determine, based on the first signal, that the climb rate of the aircraft is positive, and in response to the determination causes a retraction alert to be issued to a flight crew of the aircraft, wherein the retraction alert is indicative that a landing gear of the aircraft is retractable;
receive a second signal indicative of lift-off of the aircraft; and
cause a lift-off alert to be issued to the flight crew of the aircraft in response to the second signal.

8. The aircraft system according to claim 7, wherein the controller is configured to cause the lift-off alert to cease based on an earlier of:
causation of issuance, by the controller, of the retraction alert; and
elapse of a predetermined time period, the predetermined time period starting when the controller causes the lift-off alert to be issued.

9. The aircraft system according to claim 7, further comprising a cockpit user interface configured to issue the lift-off alert.

10. The aircraft system according to claim 9, wherein the cockpit user interface is configured to issue the retraction alert in a different form to the lift-off alert.

11. An aircraft system for an aircraft, the aircraft system comprising a controller that is configured, during a take-off procedure, to:
receive a first signal indicative of a climb rate of the aircraft;
determine, based on the first signal, that the climb rate of the aircraft is positive, and in response to the determination causes a retraction alert to be issued to a flight crew of the aircraft, wherein the retraction alert is indicative that a landing gear of the aircraft is retractable;

receive a third signal indicative that a predetermined retraction inhibition criterion is met; and
inhibit issuance of the retraction alert based on the third signal.

12. The aircraft system according to claim 11, wherein the predetermined retraction inhibition criterion comprises one or more of:
that a landing gear retraction fault has occurred,
that a threshold positive rate of climb of the aircraft is not achieved after lift-off of the aircraft,
that a negative rate of climb is achieved after lift-off of the aircraft,
that the aircraft is in contact with the ground after lift-off of the aircraft, and
that a brake of the landing gear is at a temperature greater than a threshold temperature.

13. An aircraft control system of an aircraft, the aircraft control system comprising:
a cockpit user interface; and
a controller communicatively coupled to the cockpit user interface;
wherein the cockpit user interface is operable by a flight crew of the aircraft to manually input a command to cause retraction of a landing gear of the aircraft; and
wherein the controller, during a take-off procedure, is configured to:
determine that a predetermined gear retraction criterion is met; and
send a retraction signal to the cockpit user interface when the controller determines that the predetermined gear retraction criterion is met,
wherein the cockpit user interface is configured to issue a retraction alert to a flight crew of the aircraft in response to the retraction signal without causing operation of the cockpit user interface to cause retraction of the landing gear.

14. The aircraft control system according to claim 13, wherein the predetermined gear retraction criterion comprises one or more of:
that the aircraft is flying with a positive climb rate,
that the landing gear is in an extended position, and
that lift-off of the aircraft has occurred.

15. The aircraft control system according to claim 13, wherein the controller is configured to send a cease-retraction-alert signal to the cockpit user interface when the cockpit user interface is operated by the flight crew to manually input the command to cause retraction of the landing gear of the aircraft, and the cockpit user interface is configured to cease the retraction alert based on receipt of the cease-retraction-alert signal.

16. A method of operating a controller of an aircraft system of an aircraft during a take-off procedure, the method comprising:
the controller receiving a first signal indicative of a climb rate of the aircraft;
the controller determining, based on the first signal, that the climb rate of the aircraft is positive; and
the controller causing a retraction alert to issue to a flight crew of the aircraft in response to the determination that the climb rate is positive, wherein the retraction alert is indicative of the aircraft being in a flight condition to retract a landing gear of the aircraft,
wherein the controller is configured to cause the retraction alert to be issued without causing operation of a cockpit user interface operable by a flight crew to manually input a command to cause retraction of the landing gear.

17. The method according to claim 16, comprising:
the controller receiving a second signal indicative of lift-off of the aircraft; and
the controller causing a lift-off alert to be issued to the flight crew of the aircraft on the basis of the second signal.

18. The method according to claim 16, comprising:
the controller receiving a third signal indicative that a predetermined retraction inhibition criterion is met; and
the controller inhibiting issuance of the retraction alert on the basis of the third signal.

19. A non-transitory computer-readable storage medium storing instructions that, if executed by a controller of an aircraft system of an aircraft, cause the controller to carry out the method according to claim 16.

* * * * *